United States Patent [19]
Dillard et al.

[11] Patent Number: 5,022,913
[45] Date of Patent: Jun. 11, 1991

[54] STABILIZED AMMONIUM ORTHOPHOSPHATE SUSPENSIONS

[75] Inventors: Ewell F. Dillard, Florence; James R. Burnell, Sheffield, both of Ala.

[73] Assignee: Tennessee Valley Authority, Muscle Shoals, Ala.

[21] Appl. No.: 399,032

[22] Filed: Aug. 28, 1989

[51] Int. Cl.$^5$ .................. C01B 25/28; C05B 7/00; C05B 11/10
[52] U.S. Cl. .................................. 71/34; 71/43; 71/64.08; 423/310; 423/313
[58] Field of Search ............... 71/34, 43, 64.08; 423/310, 313

[56] References Cited

U.S. PATENT DOCUMENTS

| | | | |
|---|---|---|---|
| 3,813,233 | 5/1974 | Kendrick | 71/43 |
| 4,066,432 | 1/1978 | Jones | 71/64.08 |
| 4,137,063 | 1/1979 | Sardisco | 423/313 |
| 4,375,980 | 3/1983 | Jones et al. | 423/310 |

Primary Examiner—Wayne A. Langel
Attorney, Agent, or Firm—Robert A. Petrusek

[57] ABSTRACT

An improved batch process for the production, in equipment readily available at the fertilizer dealer level, of high-analysis stable ammonium orthophosphate suspension fertilizers effected by the ammoniation of solid intermediates derived from wet-process orthophosphoric acids or combinations of the solid intermediates with such wet-process type acid or other impure phosphoric acids. Fluorosilicic acid, a by-product of the phosphate industry which is readily available and relatively inexpensive, is utilized as a source of fluoride. The fluorosilicic acid is added to the batch formulation prior to the ammoniation step thereby allowing the fluorosilicic acid to be converted to ammonium fluoride. Subsequently, the metallic impurities are allowed to precipitate as fluoride compounds instead of the usual troublesome impurity-phosphate-water gels which have been identified as causing complete destruction of suspension fluidity during storage. This specific sequencing of process steps produce suspensions which can be stored for substantial periods of time without becoming thixotropic and/or so thick that they have to be diluted before use as is the case in suspensions prepared by prior art procedures.

22 Claims, 2 Drawing Sheets

Batch Production of Ammonium OrthoPhospate Base Suspension Fertilizers

Batch Production of Ammonium OrthoPhospate Base Suspension Fertilizers

Relationship of Total Cation Impurities (Oxides of Fe, Al, Ca, & Mg) and Weight Percent Water-Insoluble Solids in 11-33-0 Suspensions

STABILIZED AMMONIUM ORTHOPHOSPHATE SUSPENSIONS

The invention herein described may be manufactured and used by or for the Government for governmental purposes without the payment to us of any royalty therefor.

INTRODUCTION

The present invention relates to an improved method for the batch production (from low-cost raw materials) of high-analysis, high-quality ammonium orthophosphate suspension fertilizers. The instant, new, novel, and economical batch method is effected by the ammoniation of solid intermediates derived from wet-process orthophosphoric acid such as monoammonium phosphate (MAP) or combinations of such solid intermediates and wet-process or other impure phosphoric acids. As used and claimed herein, the term "wet-process acid" means and includes a variety of orthophosphoric acids such as filter grade, merchant grade, or concentrated merchant grade acids derived principally from the acidulation of phosphate rock with mineral acids. It also includes such acids as well as "pure" phosphoric acids of the furnace type, after they have been used in any number or variety of industrial applications such as, for example, pickling media, and have become tainted with a variety of additional impurities incorporated therein.

In particular, the present invention relates to the means and methods for the production of stable ammonium phosphate suspensions characterized as having very good physical properties. More particularly, these stable ammonium phosphate suspension fertilizers are characterized by low viscosity and high pourability during sustained and less than desirable storage conditions to thereby ease certain problems associated with material distribution, especially during the hot weather season when temperatures may exceed 100° F. and resulting formation of impurity-phosphate-water gels is accelerated.

BACKGROUND OF THE INVENTION

1. Field of the Invention

Heretofore, suspension fertilizers produced batchwise by the direct ammoniation of solid intermediates derived from wet-process orthophosphoric acids or combinations of such solid intermediates and wet-process or other impure phosphoric acids were found to be relatively unstable because the acid congeneric metallic cation impurities caused the formation of strong gels during storage which gels could not be broken unless the suspension was diluted to a lower grade, and in some cases even dilution did not result in a product having enough fluidity to be conveniently handled. In order to produce suspensions that were fluid and easily handled during the complete storage-distribution cycle, relatively low-grade products had to be produced in order to avoid such high viscosity and low-pourability problems. These low-grade products presented a very distinct disadvantage because of transportation and handling as well as application costs together with reduced effective producer storage capacity, which reduced effective storage capacity was or is a substantial concern during the critical period comprising the spring rush season.

2. Description of the Prior Art

Prior art suspension fertilizer production technology is well known and fully described in the literature. See, just for example, the following references, most of which are assigned to the assignee of the present invention, and are discussed in greater detail, infra:

| U.S. Pat. No. | Author | Issue Date |
|---|---|---|
| 3,019,099 | Walters | 01/30/62 |
| 3,813,233 | Kendrick | 05/28/74 |
| 3,711,268 | Frazier | 01/16/73 |
| 3,861,897 | Frazier | 01/21/75 |
| 4,066,432 | Jones | 01/03/78 |
| 4,375,980 | Jones, et al. | 03/08/83 |
| 4,383,847* | Barber | 05/17/83 |
| 4,511,388 | Jones, et al. | 04/16/85 |

*Not assigned to the assignee of the present invention.

Examples of other literature published by investigators and researchers of the assignee of the present invention and dealing with complexing impurities salts in suspension fertilizers are:

Dillard, et al. "Precipitated Impurities in Monoammonium Phosphate and Their Effect on Chemical and Physical Properties of Suspension Fertilizers," TVA Bulletin Y-183, NFDC, Muscle Shoals, Ala.

Dillard, et al. "Precipitation of Impurities in 9-32-0 Grade Fluid Fertilizers," TVA Bulletin Y-194, NFDC, Muscle Shoals, Ala.

Frazier, et al. "Solubilities in the System Magnesium Oxide-Ammonia-Orthophosphoric Acid-Pyrophosphoric Acid-Water at 25° C.," TVA Bulletin X-507, NFDC, Muscle Shoals, Ala.

Jones, et al. "High-Grade Suspensions Produced from Wet-Process Orthophosphoric Acid," NFDC, Muscle Shoals, Ala.

Phosphate base suspension fertilizers are commonly produced by the direct ammoniation of phosphoric acids or slurries of solid intermediates derived from monoammonium phosphate (MAP). During the last several years, most ammonium phosphate fluid fertilizers having desirable storage properties contained substantial proportions of the $P_2O_5$ present as polyphosphates. Polyphosphates have long been known to increase the solubility of the phosphate salts and aid in the sequestering of the congeneric metallic impurities that otherwise form gel-like compounds which compounds tend to destroy the fluidity of the resulting concentrated fluid fertilizers, U.S. Pat. No. 3,015,552, Striplin, et al., Jan. 2, 1962, assigned to the assignee of the present invention. In most cases, such fluid fertilizers were of the solution-type and consequently contained no undissolved solids. The cost for fluid fertilizers containing polyphosphates has been relatively high, and as a result, such fluid fertilizers have experienced difficulty in competing with solid fertilizers. Generally, wet-process orthophosphoric acid (50–56% $P_2O_5$) costs less per unit of $P_2O_5$ than merchant-grade superphosphoric acids (68–70% $P_2O_5$), containing polyphosphates. However, even with such lower costs the overall role of orthophosphoric acid as the sole phosphate source in the production of suspensions has remained somewhat limited over the years. The principle reason for such limited utilization of ortho acid has been the economically restrictive relatively low grades which can be produced from them because of the presence of congeneric impurities such as iron, aluminum, magnesium, and calcium, which impurities post precipitate as amorphous compounds with gel-like characteristics after such acids have been ammoniated. These gel-like compounds completely destroy the fluidity of high-analysis suspension fertilizers and make it necessary to dilute same with water to lower the grades thereof to avoid gelation or severe thickening during production, transportation, storage, and/or distribution. In the past when high-grade suspensions were produced from such low-cost, merchant-grade wet-process phosphoric acids, severe problems were encountered with transfer pumps, pipelines, tanks, and valves when such suspensions, being in a semisolid condition, were being produced or otherwise handled. It has oftentimes been the experience of many fertilizer dealers that when such suspension products become semisolid, it is extremely difficult and expensive to restore their fluidity to the point where they can be used either for direct application or in the subsequent production of mixed fertilizer grades by adding thereto a source of nitrogen and/or potash.

A typical method for producing suspension fertilizers at the dealer level is by the batch ammoniation of MAP. Such batch processing is economical and relatively straightforward and can be retrofitted in production systems and operations which most dealers have and presently utilize. MAP is a high-grade solid intermediate (11-52-0 grade) produced from merchant-grade orthophosphoric acid (normally 54% $P_2O_5$) by using any of numerous granulation processes known in this art. It therefore contains all of the impurities (congeneric) that were originally present in the starting wet-process acid. MAP is an attractive raw material because it is widely available and easy to store. Most suspensions made from MAP are produced in the early spring or late winter and therefore must be stored for periods of time ranging upwards to 3 months. These suspensions are then transferred to cold-mix equipment to produce the desired mixed fertilizer grades. Severe problems often occur during this long storage period, with the product becoming thixotropic and very difficult to handle. This is due to the impurities forming gelatinous compounds which destroy fluidity. When such gel formation occurs, the only viable approach available to the dealer has been to dilute the suspension with water to thereby lower the grade. This encroaches upon otherwise valuable time during the rushed peak season. The same problems occur and the same approach is necessary when wet-process orthophosphoric acid is used as the phosphate source or if combinations of MAP and wet-process orthophosphoric acid are used. Until the instant invention and its related technology was developed, the only way known for increasing the fluidity of such orthophosphate suspensions was by means of dilution of same with water, which resulted in unwanted reduction in product grades.

In 1962, Walters ('099, supra) produced 8-24-0 grade ammonium orthophosphate suspensions by both batch- and continuous-type operations by the ammoniation of wet-process orthophosphoric acids. In this work, Walters found that the impurities in the fairly clean wet acids he was dealing with caused a thixotropic characteristic which prevented the production of higher grade suspensions because of excessively high viscosities. Walters used these gel-like compounds to prevent settling of the ammonium phosphate crystals in his relatively low-grade suspension fertilizers.

In 1974, Kendrick ('233, supra) identified techniques and methods in which impure wet-process orthophosphoric acid can be ammoniated without producing gel-like impurity compounds which compounds caused complete destruction of the suspension fluidity. Kendrick's teachings involved the continuous ammoniation of the wet acid in two separate stages. By means of such two-stage processing he was able to produce much higher grades (such as 11-39-0 versus 10-30-0) having good storage properties. He also made similar products by a batch simultaneous procedure which procedure, he indicated, did not work quite as well as did his continuous procedure.

In 1977, Jones ('432, supra) improved on Kendrick's teachings by developing a three-stage process for the production of satisfactory high-grade suspensions through the ammoniation of wet-process orthophosphoric acids under conditions in which gel-like impurity related compounds did not form. In this work, the product (13-38-0 grade) crystals did not settle or pack during transit due to the vibrational energy that occurs especially during shipment by rail as was the case in products produced by Kendrick's teachings. In 1984, Jones, et al., ('388, supra) developed a batch procedure based on the same phenomena in which he ammoniated wet-process orthophosphoric acids directly by using a heel of hot product from a previous batch to provide the nuclei and environment in the reactor for making metallic impurity crystalline compounds instead of the metallic impurity gel-like compounds which gels cause destruction of the suspension fluidity. A significant negative trade off of this procedure was the reduction of the net volume of each batch by at least one-third because of the necessity of maintaining such heel. Also, the procedures of Jones, et al., did not completely stabilize the suspension during long-term storage.

Until the development of the present invention, all efforts to produce high-analysis ammonium orthophosphate suspensions having satisfactory storage properties by stabilizing the congeneric impurities stemming from wet-process phosphoric acid with the addition of fluorine-containing compounds have either not been successful or have not been adopted by the fluid fertilizer suspension industry, it being appreciated that the use per se of fluorine in research is not new or novel regarding fertilizers of either the solid or fluid form.

As early as 1973, Frazier ('268, supra) found that a small excess of the fluoride ion over that required to react with all the aluminum and magnesium in ammonium and potassium polyphosphate liquid fertilizer solutions would prevent the post precipitation of the wet-acid congeneric impurities during product storage. Inversely, a smaller amount of fluorine added allowed precipitation of the metallic cations so that they could be filtered out to obtain a stabilized solution.

The instant, new, and novel invention teaches a critical sequence of fluorine addition to effectively decrease the resulting water-insoluble solid contents of product suspensions and does not effect an increase in post precipitation as a mechanism to remove the impurities in solution. In addition, the present invention deals with the production of suspension fertilizers and not true solutions as does Frazier's teachings.

Later in 1975, Frazier ('897, supra) again developed a procedure in which a small excess of fluoride was added to prevent precipitation of aluminum and magnesium by using the fluoride ions to sequester the metal cations.

The instant, new, and novel procedure differs once again from this later work of Frazier in that it is concerned with producing suspensions and not true solutions. Also, referring to Example IV, infra, fluoride levels used in Frazier's work with fluorosilicic acid as the fluoride source for solutions are too low and would not be applicable to use in suspensions because at the levels shown necessary for practice of this invention, Frazier's teachings indicate that the pourability is significantly decreased by the formation of a silica gel during storage of his solutions.

In 1983, Jones, et al. ('980, supra), developed a process in which small proportions of fluorosilicic acid (0.1% to 0.5 by weight percent) were added, in the production of suspensions made from wet-process orthophosphoric acid or other impure acids, to cause modifications of the resulting ammonium phosphate crystals. This phenomena prevented excessive settling during transit caused by vibrational energy. Jones, et al., teach that the fluorosilicic acid which is introduced into the mixing vessel is proportioned with his resulting cooled ammoniated material introduced therein to effect a fluorosilicic acid concentration in his resulting stable suspension of about 0.1 to 0.5 weight percent. The present invention differs from Jones, et al's teaching in the following two respects. First, in the instant, new, and novel process, operation is at higher fluoride levels than Jones, et al., teach can be used. For instance, Jones, et al., teach that if more than about 0.5 weight percent $H_2SiF_6$ is used in his third stage (after all ammoniation is complete) this would cause formation of $SiO_2.H_2O$ gels which gels would completely destroy the fluidity of his suspension fertilizer. Secondly, work by Jones, et al., revolves around adding the fluorisilicic acid after the ammoniation is completed and the product is cooled (100° to 130° F.) whereas in the instant new procedure, the fluorosilicic acid is added prior to the ammoniation step(s) with the temperature ranging from 165° to 210° F., see Example IV, infra.

In a 1983 publication entitled "A Waste Recovery Story, Barber, et al., discuss the use of wastewater which contains fluorine to use as a substitute for make-up water in the overall formulation. As with Jones, et al. ('980, supra), the fluorine was added after ammoniation and after the product was cooled. Again only 0.4 weight percent fluorosilicic acid was added. As discussed in Example IV, infra, these procedures would cause destruction of suspension fluidity. One interpretation of the teachings of this publication is that insufficient fluorine is available in the wastewater to provide the levels that are needed to improve the physical properties of the suspension fertilizers so extra wastewater is added to the cooled product to improve the viscosity and pourability of the suspension. This appears quite contrary to the findings leading to development of the present invention which indicate that when fluorosilicic acid is added as the fluoride source to the cooled product, strong silica gels are formed which destroy suspension fluidity. Accordingly, the investigators who developed the present invention are not throughly convinced that such process, as taught by Barber, et al., just supra, can be used for the continuous production of suspension fertilizers. The procedure of the instant invention differs from that of Barber, et al., in two ways. First in its principally intended environment, it uses batch-type processing whereas Barber, et al., describe a continuous-type process. Secondly, the fluorosilicic acid is added prior to the instant ammoniation step without any attendant fluorine evolution and such instant ammoniation step is subsequently initiated within a relatively short time thereafter, about 1 to 5 minutes, and the subsequent ammoniation step is also quickly completed, i.e., usually in about 15 minutes. In Barber, et al.'s, publication, supra, they teach adding fluorine to their first-stage reactor during ammoniation at boiling temperatures of about 230° F. with no mention of attendant fluorine evolution. Based on the data leading to Example V, infra, substantial evolution of fluorine would occur using Barber, et al.'s, procedure, and would be expected since the first-stage reactor is operated at a pH of between 4.5 and 5.0 and at a temperature of about 230° F. (boiling) with a retention time of greater than 30 minutes. Data indicate that about 30 to 36 percent of the fluorine added in this first-stage of Barber, et al., would be evolved. On the other hand, the instant new batch procedure shows no fluorine loss during the quickly effected ammoniation step.

SUMMARY OF THE INVENTION

The present invention relates to an improved batch-type method for the production of suspension fertilizers by the ammoniation of slurries of solids produced from wet-process orthophosphoric acids or combinations of such solids with wet-process or other impure phosphoric acids. An example of such a solid is MAP. The instant method involves the use of an additive fluoride compound, fluorosilicic acid, a commonly produced by-product of the fertilizer industry. The instant new batch procedure involves the addition of fluorsilicic acid as the fluoride source to the phosphate source prior to the ammoniation step to thereby allow and provide for the conversion of the fluorosilicate to the fluoride compounds thereby effecting significant improvements in the handling properties of resulting suspension fertilizers during their production, storage, and application. This sequence of fluoride addition allows the troublesome congeneric metal impurities in the feed stream to post precipitate as fluoride compounds instead of the troublesome impurity-phosphat-water gels which gels otherwise cause the subsequent complete destruction of suspension fluidity.

OBJECTS OF THE INVENTION

It is, therefore, the principal object of the present invention to provide a simple, economical, batch-type process for the production of high-quality, high-analysis phosphate base suspension fertilizers from low-cost raw materials such as wet-process orthophosphoric acids or products derived from such acids such as MAP.

Another object of the present invention is to produce concentrated and free flowing (through distribution equipment orifices) suspension fertilizers by a simple process which can be used in existing small- or large-scale equipment without modification. The instant, new, and novel process can be operated under conditions which prevent formation of gelatinous metallic impurity compounds which impurity compounds normally cause intolerably high viscosities, nonpourability, and complete destruction of suspension fluidity.

A still further object of the present invention is to produce high-analysis phosphate base suspension fertilizers which maintain good storage and handling properties for 30 to 90 days after production and are eminently suitable for use in subsequently producing $N-P_2O_5-K_2O$ mixed-grade suspensions because said phosphate base suspensions have complete fludity and can be easily transferred from storage to the desired batch mixer without the added cost of diluting same with water.

Still a further object of the present invention is to allow the fluoride additive to be used economically and without environmental concern with no adverse agronomic effects and without any significant sacrifice in suspension quality, grade, and versatility.

Still further and more general objects and advantages of the present invention will appear from the more detailed description set forth in the following description of the preferred embodiment and examples, it being fully understood, however, that the more detailed description is given by way of illustration and explanation only and not necessarily by way of limitation, since various changes therein may be made by those skilled in the art without departing from the true scope and spirit of the instant invention.

DESCRIPTION OF THE DRAWINGS

The instant invention, together with further objectives and advantages thereof, will be better understood from a consideration of the following description taken in connection with the accompanying examples and drawings in which.

Figure 1:
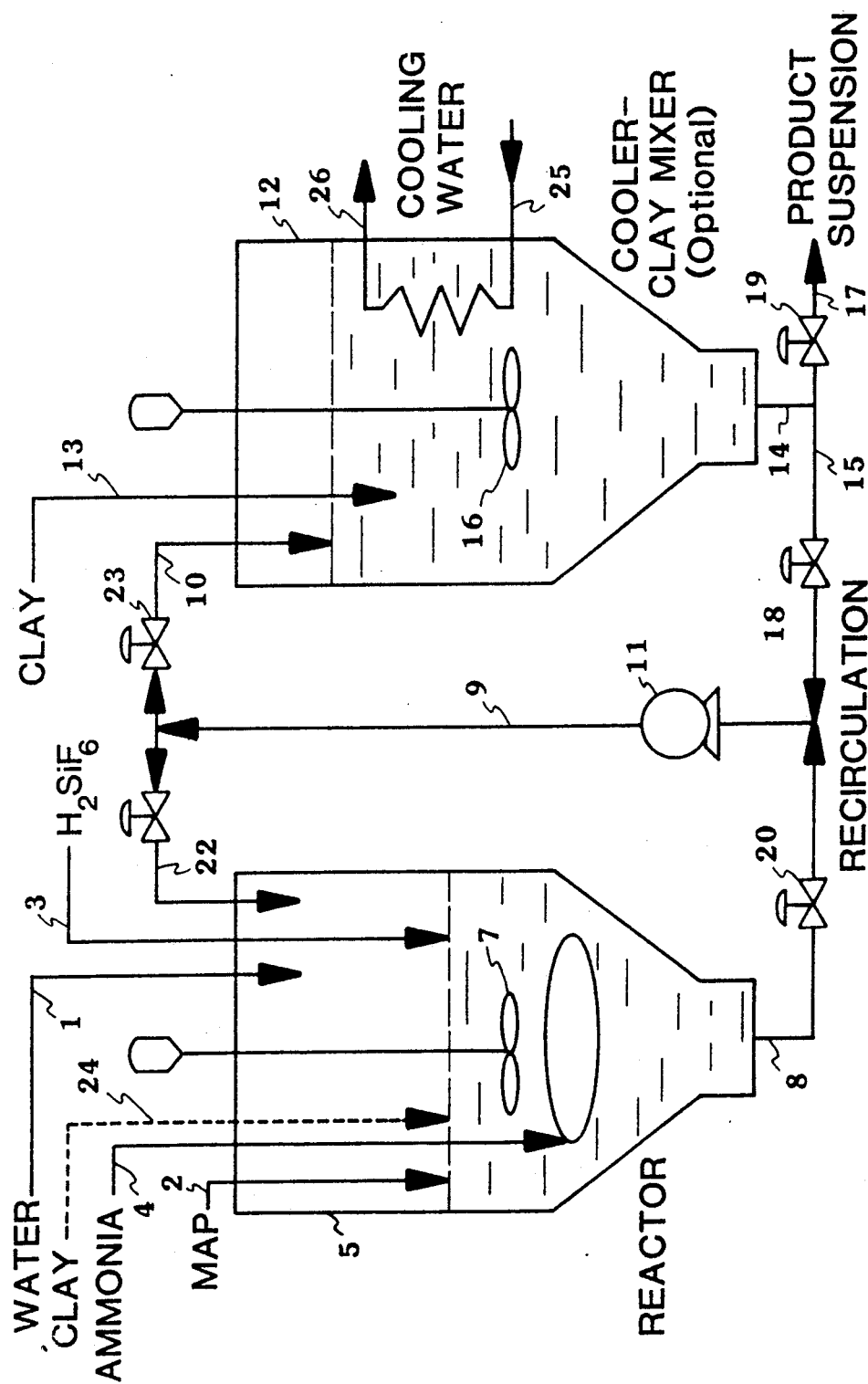
FIG. 1 is a flowsheet generally illustrating the principles of the present novel batch-type process.

Referring now more specifically to FIG. 1, raw materials comprising solid intermediates such as MAP, wet-process or other impure phosphoric acids, or various combinations of both together with the water of formulation are fed from sources not shown via lines 1 and 2 to reactor 5. Fluorosilicic acid solution and ammonia, from a source not shown, is fed via lines 3 and 4, respectively, into reactor 5. As shown, reactor 5 is equipped with stirrer 7. The reaction products resulting from such introduction and subsequent mixing are transferred via lines 8, 9, and 10 as well as transfer means 11 from reactor 5 to optional cooler-clay mixer 12 wherein the slurry is rapidly cooled from a temperature range of about 150° to 230° F. down to the range from about 120° to 140° F. Attapulgite clay, from a source not shown, is fed to cooler 12 through line 13 and recirculated via lines 14, 15, 9, and 10 as well as transfer means 11 to gel the same therein. To aid in the gelation of the clay, stirrer 16 in cooler 12 is provided. The final product suspensions are subsequently discharged via line 17 to storage (not shown) or cold-blending with potassium chloride and nitrogen sources to produce N-P$_2$O$_5$-K$_2$O mixed-grade suspensions. Check valves 18, 19, 20, 21, and 23 allow transfer of materials from cooler 12 and reactor 5 to storage via line 17 or recirculated via pump or other transfer means generally shown at 11 through the cooling and reaction loops. It should be pointed out that use of cooler-clay mixer 12 is optional since some dealers prefer not to make the capital investment nor spend the time and money necessary to effect cooling of the product before storage, as for example with cooling water introduced to cooling means which is generally shown as water inlet line 25 and water outlet line 26. In this case, attapulgite clay is added to reactor 5 via line 24 after the reaction loop has been concluded (ammoniation step completed). The added clay is gelled by recirculating the slurry via lines 8, 9, and 22 in conjunction with pump 11 and stirrer 7. The resulting product suspension is still discharged via line 17. This embodiment of the instant invention, i.e., being able to substantially eliminate cooling of the product suspension, is anticipated to represent a principal advancement of this art by allowing similar or other processes to be likewise so conducted.

DESCRIPTION OF THE PREFERRED EMBODIMENTS

Figure 2:
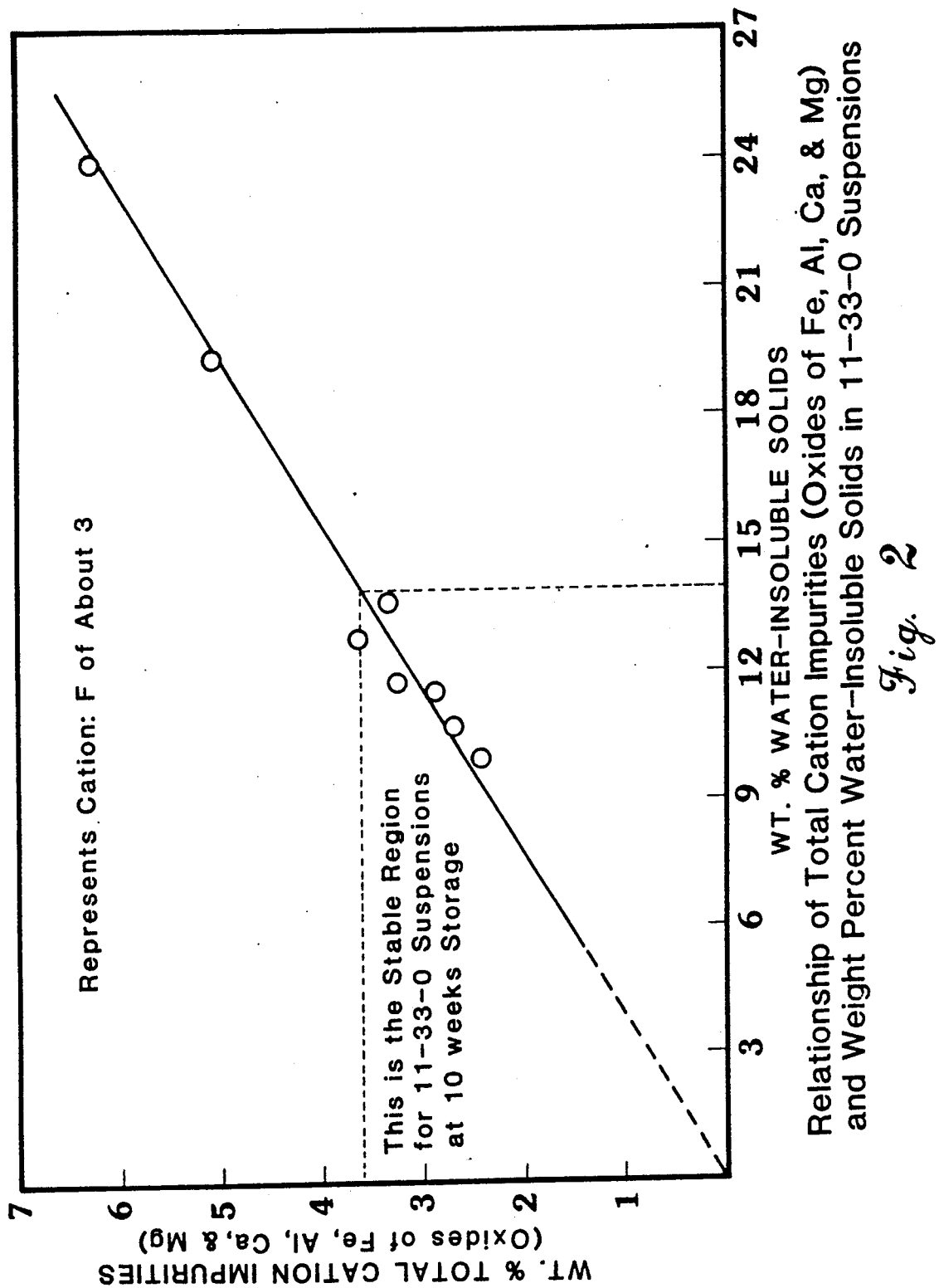
FIG. 2 graphically illustrates the benefits derived by the instant invention by adjusting the fluorine level to both the total water-insoluble solids content of the resulting suspension and the ratio of total cation to fluorine. For the sake of ease in understanding and convenience to the reader this relationship is discussed in greater detail along with FIG. 2 in the section dealing with the preferred embodiments, infra.

In carrying out the objects of the instant invention in one form thereof, it has been found that concentrated ammonium orthophosphate base suspension fertilizers having both high analysis and high quality can be produced by the ammoniation of solid intermediates derived from wet-process orthophosphoric acids or combinations of such solid intermediates and wet-process or other impure phosphoric acids in a batch-type process using as a fluorine source, fluorosilicic acid, which acid is commonly produced as a by-product by the fertilizer phosphate industry. More so, the fluorosilicic acid is common to wet-process acid and triple superphosphate producers and can be purchased relatively cheap, i.e., on the order of 50 to 80 dollars per ton for a 18 to 20 weight percent fluorine concentration. It has been further discovered that the fluorine level, if adjusted to both the total water-insoluble solids content of the suspension fertilizers and the total cation (aluminum-+iron+magnesium+calcium) to fluorine ratio (as shown in FIG. 2, supra) can improve the storage properties of resulting phosphate base suspension fertilizers. As is indicated in FIG. 2, cation to fluorine ratios of 3 or less and total water-insoluble solid contents of 14 weight percent or less are required to produce satisfactory suspension fertilizers. The level of fluorine needed is generally in the range of about 0.6 to 1.0 weight percent which amounts to about 10 to 20 pounds of fluorine per ton of product. These amounts correspond to about 1 to 3 dollars per ton of 10-30-0 grade suspension fertilizer when using 11-52-0 grade MAP as the starting phosphate source.

It has been found still further that the instant fluorine additive and sequencing works even when using "sludge" MAP of very high impurity levels. The grade is somewhat decreased from 10-30-0 to perhaps as low as 9-21-0, but benefits are still made by the addition of fluorine. In addition, it has been discovered that grades as high in analysis as 12-36-0 can be produced and stored using such fluorine addition to the wet-process orthophosphoric acid prior to the ammoniation step just as is the case when using MAP as feedstock. This particular sequence of fluorine addition allows the congeneric impurities to form fluoride compounds rather than the troublesome metallic impurity-phosphate-water gels that act to destroy suspension fluidity.

Further, it has been discovered that suspension fertilizers containing extra fluorine have significantly improved storage properties over suspensions in which the fluorine level has not been adjusted. This is evidenced by the fact that suspensions made by the instant new procedure do not experience thixotropy during storage to the point that they have to be diluted before being used in subsequently producing N-P$_2$O$_5$-K$_2$O formulations. Suspensions made according to the instant invention are completely pourable at all times and in many cases air sparging thereof is not necessary to maintain or store a product exhibiting good physical properties.

The principal advantage realized by practicing the teachings of the instant invention is that high-analysis, stable ammonium orthophosphate suspension fertilizers can be produced in existing dealer equipment from low-cost raw materials such as wet-process phosphoric acids and solid intermediates made from such or both. Such equipment usually consists of a batch mixer or reactor and a cooler-clay mixer and most of it is already available in existing fertilizer dealer plants. Also, the cooler-clay mixer is an optional piece of equipment in that the clay can be added and gelled in the batch mixer. Cooling of the product suspension is optional because some dealers use the product quicker than others. Also, some dealers feel that they had rather deal with the large crystal problem associated with not cooling the slurry rapidly below the saturation temperature to produce an abundance of small crystals which do not grow during storage than to expend capital for installing a cooler. Therefore, the suspensions produced by the instant novel process may vary in grade and in use which should make same attractive to both small- and large-scale dealers. Also, the ease of handling these suspensions together with the simplicity and versatility of batch operation substantially enhances its overall potential use.

EXAMPLES

In order that those skilled in the art may better understand how the present invention can be practiced, the following examples are given by way of illustration only and not necessarily by way of limitation.

EXAMPLE I

This example illustrates the differences in suspensions prepared by the prior art batch-type process for ammoniating MAP with those prepared in accordance with the main embodiment of the present invention.

Phosphate base suspension fertilizers of 10-30-0 grade were produced in laboratory-scale equipment by the ammoniation of MAP made from wet-process orthophosphoric acid derived from Central Florida ore by-product of the instant invention. The 10-30-0 grade product has excellent long-term storage properties and is an excellent phosphate source for use in production of mixed-grade suspension products of various $N:P_2O_5:K_2O$ ratio and grade by well-known cold-blending procedures. If desired, this product can be applied directly to the soil.

The operating procedure used for the production of the base suspensions shown in Table I, infra, consisted of adding the water of formulation, MAP, and the fluorosilicic acid to the batch mixer, and rapidly ammoniating the slurry to a desired pH between 6.5 and 7. The amount of fluorine added as fluorosilicic acid was 1.2 weight percent. This was determined to be sufficient based upon the amount of water-insoluble solids in the suspension fertilizer being maintained at not greater than 14 percent (FIG. 2) and with a MAP to which such fluorine addition adjusted the cation:F final ratio to about 3 or less. The water-insoluble solid content was determined by adding 50 grams of the suspension to about 500 cm$^3$. of water and mixing for about 15 minutes. The slurry was then filtered and the filter cake dried. The water-insoluble content was then determined by weighing the filter cake and calculated by dividing the filter cake weight by the sample weight. Generally, the amount of fluorine added as fluorosilicic acid (23 weight percent $H_2SiF_6$ solution, 18 to 20% F.) is in the range of 0.6 to 1.2 percent by weight for most nominal 11-52-0 MAPs. See Example VII, infra, where about 5.0 percent fluorine had to be added to effect lowering of the water-insoluble (W.I.) to less than about 14 percent. However, this amount of fluorine reduced the cation:F to much less than 3, i.e., about 0.5. The maximum temperature that the slurry reaches during the autogenous ammoniation step is in the range of about 150° to 180° F. After the ammoniation step was completed, the slurry was cooled to about 130° F., and 1 percent of attapulgite clay was added and gelled with vigorous agitation. The total batch time for the complete operation was about 20 to 25 minutes. The storage time for these tests can be accelerated by storing the sample at 100° F. for 1 week.

The product suspensions are compared in Table I, infra, along with similar suspensions that were produced by currently practiced single-stage prior-art procedures in which no fluorosilicic acid was used in the formulations. Satisfactory base suspension fertilizers are required to have viscosities that do not exceed the limits of 1000 centipoises at 80° F. and 1500° centipoises at 32° F. when measured with a Brookfield viscometer (model RVT). NOTE: Any references made herein to materials and/or apparatus which are identified by means of trademarks, trade names, etc., are included solely for the convenience of the reader and are not intended as, or to be construed, an endorsement of said materials and/or apparatus. They are also required to be at least 98 percent pourable by volume in one minute at both evaluation temperatures (80° and 32° F.) and contain no large crystals, i.e., crystals that exceed 20 mesh (850 micrometers).

TABLE I

Phosphate Base Suspension Fertilizers Made by Ammoniation of Monoammonium Phosphate$^{a,b}$

| Suspension grade | Wt % F added$^d$ | Initial viscosity, cP @ 80° F.$^e$ | After storage for 30 days @ 100° F. | |
|---|---|---|---|---|
| | | | Viscosity, cP @ 80° F.$^e$ | Pourability, % of total volume$^f$ |
| Batch-type process of the instant invention | | | | |
| 11-33-0 | 1.2 | 440 | 350 | 100 |
| 10-34-0 | 1.2 | 420 | 300 | 100 |
| 10-30-0 | 1.2 | 200 | 160 | 100 |
| Normal batch-type process | | | | |
| 11-33-0 | 0 | 850 | >1000 | 50 |
| 10-30-0 | 0 | 450 | 640 | 75 |

TABLE I-continued

Phosphate Base Suspension Fertilizers Made by Ammoniation of Monoammonium Phosphate[a,b]

| Suspension grade | Wt % F added[d] | Initial viscosity, cP @ 80° F.[e] | After storage for 30 days @ 100° F. | |
|---|---|---|---|---|
| | | | Viscosity, cP @ 80° F.[e] | Pourability, % of total volume[f] |
| 9-27-0 | 0 | 250 | 500 | 100 |

[a]Produced from wet-process orthophosphoric acid derived from Central Florida phosphate ore. Contained 11.2% N, 51.7% $P_2O_5$, 2.4% $Fe_2O_3$, 2.6% $Al_2O_3$, 0.6% MgO, 0.6% CaO, 1.8% F, 4.8% $SO_4$, and 18.8% water-insoluble solids.
[b]Process consisted of equipment arrangement shown in FIG. 1. Comparison is of products made by the new batch-type procedure with those produced by the normal batch-type process.
[c]Suspensions contained 1.5 attapulgite clay.
[d]Added as fluorosilicic acid (23% solution), 18% F.
[e]Suspensions were mixed for 5 minutes with a propeller-type stirrer before measurements were made.
[f]After being rotated end-over-end four times.

The results shown in Table I, supra, clearly indicate that suspensions produced by the instant new batch-type process are higher in grade (N+$P_2O_5$) and have significantly better storage properties as evidenced by the viscosity and pourability data than those produced by the normal prior art batch-type process.

EXAMPLE II

This example illustrates that phosphate base suspension fertilizers with a grade of 10-30-0, 1.5 percent clay, and which are entirely satisfactory for application to the soil, or in production of mixed suspension fertilizers with various ratios and grades, or long-term storage, can be produced by practice of the new batch-type procedure described in Example I, supra, using either anhydrous ammonia (82-0-0) or aqua ammonia (20-0-0 to 24-0-0). The MAP used to produce the 10-30-0 grade suspensions was made from merchant-grade wet-process orthophosphoric acid derived from Central Florida ore. The formulation and operating conditions for production of a 10-30-0 grade suspension having good physical properties are shown in Table II, infra. No problems with the formulations were encountered with either ammonia source since one works as well as the other. In addition, it has been determined that with most MAP sources which are presently commercially available, about 0.6 percent fluorine added as fluorosilicic acid is sufficient to produce a satisfactory suspension having good storage and handling properties.

TABLE II

Formulations and Results for Production of 10-30-0 Grade Suspension From Monoammonium Phosphate[a,b]

| Batch reactor[c] | Feed, lb | (Feed, kg) |
|---|---|---|
| Option 1 | | |
| Water | 664 | (301.8) |
| MAP[a] | 1154 | (524.5) |
| $H_2SiF_6$[d] | 63 | (28.6) |

TABLE II-continued

Formulations and Results for Production of 10-30-0 Grade Suspension From Monoammonium Phosphate[a,b]

| Batch reactor[c] | Feed, lb | (Feed, kg) |
|---|---|---|
| $NH_3$ (82-0-0) | 89 | (40.5) |
| Clay (1.5 wt. %) | 30 | (13.6) |
| Option 2 | | |
| Water | 442 | (200.9) |
| MAP[a] | 1154 | (524.5) |
| $H_2SiF_6$[d] | 63 | (28.6) |
| $NH_4OH$ (24-0-0) | 311 | (141.4) |
| Clay (1.5 wt. %) | 30 | (13.6) |
| Temp., °F. (°C.) | 130-190 | (54-88) |
| Mixing time, min. | 15 | |
| Product (10-30-0, 1.5% clay) | | |
| Batch size | 2000 | (909.1) |
| Total batch time, min. | 25 | |
| pH | 6.6 | |
| Density, lb/gal (kg/l) | 11.5 | (6.7) |

[a]Produced from wet-process orthophosphoric acid derived from Central Florida phosphate ore. Analyses shown in Table I, supra.
[b]Process consisted of equipment shown in FIG. 1, supra.
[c]As illustrated, procedures are suitable with either anhydrous or aqua ammonia as neutralizing nitrogen source in 10-30-0 grade formulation.
[d]23 percent solution, 0.6 percent F added.

The results of the physical property evaluation of the suspensions in Table III, infra, show that 10-30-0, 1.5 percent clay, grade suspensions produced by the instant new batch-type procedure with either anhydrous or aqueous ammonia as the nitrogen source have good storage and handling properties for up to at least 90 days when stored at either 80° or 100° F.

TABLE III

Physical Properties of 10-30-0 Grade Suspensions Made From Monoammonium Phosphate[a,b]

| Normal grade | Initial viscosity, cP @ 80° F.[c] | After quiescent storage for 90 days at | | | |
|---|---|---|---|---|---|
| | | 80° F. | | 100° F. | |
| | | Viscosity cP @ 80° F.[c] | Pourability, % of total vol.[d] | Viscosity cP @ 80° F.[c] | Pourability, % of total vol.[d] |
| 10-30-0[e] | 220 | 180 | 100 | 170 | 100 |
| 10-30-0[f] | 200 | 160 | 100 | 160 | 100 |

[a]0.6% added as $H_2SiF_6$ (23% solution), contained 1.5% clay.
[b]Analyses shown in Table I, supra.
[c]Suspensions were mixed 5 minutes with a propeller-type stirrer before measurements were made.
[d]After being rotated end over end four times.
[e]Made using aqua ammonia as nitrogen source.
[f]Made using anhydrous ammonia as nitrogen source.

EXAMPLE III

Monoammonium phosphate (MAP) is more readily available and at a cost less per unit $P_2O_5$ than is wet-process orthophosphoric acid; however, in some areas of the country waste materials such as spent phosphoric acid are readily available for disposal in fertilizer formulations as relatively inexpensive sources of phosphate. Since such spent acids contain high levels of aluminum (from pickling operations), it has heretofore been difficult to produce suspension fertilizers of high quality therefrom. Using the instant new batch process, spent phosphoric acid was tested in combination with MAP to produce high-quality suspensions by procedures as described in Example I, supra.

In this test series, one-third of the $P_2O_5$ for production of the 10-30-0 grade suspension was supplied from spent acid (26% $P_2O_5$) and two-thirds was supplied from MAP. The MAP was made from acid derived from Central Florida phosphate ore as described in Example I, supra. The formulations and operating conditions for production of a 10-30-0, 1.5 percent clay, suspension with very good physical properties are shown in Table IV, infra.

TABLE IV

Formulations, Operating Conditions, and Results of the Batch Production of 10-30-0 Grade Suspension Fertilizer From Spent Phosphoric Acid and Monoammonium Phosphate[a,b]

| Batch Reactor[c] | Feed, lb | (Feed, kg) |
|---|---|---|
| Water | 202 | (91.8) |
| MAP (11-52-0 grade) | 773 | (351.4) |
| Spent phosphoric acid (26% $P_2O_5$) | 762 | (346.4) |
| $H_2SiF_6$ (23% sol.)[d] | 93 | (42.3) |
| $NH_3$ | 140 | (63.6) |
| Clay (1.5 wt. %) | 30 | (13.6) |
| Temp., °F. (°C.) | 210 | (98.8) |
| Product (10-30-0, 1.5% clay) | | |
| Batch size, lb (kg) | 2000 | (909.1) |
| Total batch time | 25 | |
| pH | 6.6 | |
| Density, lb/gal (kg/l) | 11.5 | (6.7) |
| Viscosity, cP (Pa.S) 80° F. | 300 | (0.3) |
| Pourability, vol. % 80° F. | 100 | |

[a]One-third of $P_2O_5$ from spent acid; two-thirds from MAP.
[b]Used in bright dip baths for polishing aluminum alloys. Contains about 1 to 1.3% dissolved aluminum.
[c]Formulations were made for 1-ton batch. Operating conditions such as temperature and batch time was for 2-lb batch. Based on experience, no differences should be noted in the batch size.
[d]0.9% fluorine added.

Shown in Table V, infra, are comparisons of suspension fertilizers produced by the instant new batch procedure with those known in the prior art.

TABLE V

Phosphate Base Suspense Fertilizers Made From Monoammonium Phosphate and Spent Phosphoric Acid Combinations[a,b]

| | | Initial | After storage for 30 days @ 100° F. | |
|---|---|---|---|---|
| Grade | % F added[c] | viscosity,[d] cP @ 80° F. | Viscosity, cP 80° F.[d] | Pourability, % of total volume[e] |
| Batch-type process of the instant invention | | | | |
| 10-30-0 | 0.9 | 300 | 240 | 100 |
| Normal batch-type process | | | | |
| 10-30-0 | 0 | 380 | >1000 | 0 |

[a]Made using formulations shown in Table IV. Comparison of products made by the new batch-type procedure with those produced by the normal batch-type process.
[b]Process consisted of equipment shown in FIG. 1, supra.
[c]Added as fluorosilicic acid (23% solution).
[d]Suspensions were agitated 5 minutes before measurements were made.
[e]Rotated end over end four times before measurements were made.

The results illustrated in Tables IV and V, supra, clearly show the advantages of using fluorosilicic acid in the formulation as a fluorine source. The 10-30-0 grade suspension made using the fluorine addition is superior in every respect to the suspension produced without added fluorine. By using added fluorine, the aluminum present in the spent acid is sequestered or complexed into a fluoride compound rather than an $Al-PO_4-H_2O$ gel which gel would otherwise cause complete destruction of suspension fluidity by removal of water from the solution phase. Also, incorporating such relatively inexpensive spent acid into the formulation allows the dealer to increase his profit margin.

EXAMPLE IV

Tests were made and are presented herein to further show and emphasize that the order of addition of fluorosilicic acid to the batch formulation has a decided and critical effect on the product quality of the suspension fertilizers. In these tests, 0.6, and 0.9 weight percent fluorine, added as fluorosilicic acid, was incorporated into the batch formulation both before and after the ammoniation step. In performing these tests, other variables such as grade, $N:P_2O_5$ weight ratio, reactor temperature, retention time, etc., that are known to have effects on viscosity and pourability were kept constant throughout the series.

Results obtained from these tests, shown in Table VI infra, indicate that the fluorosilicic acid must be added prior to the ammoniation step in order to make a satisfactory suspension fertilizer having desirable physical properties. This is evidenced by the fact that when the fluorosilicic acid is added after the ammoniation step, severe problems are encountered with the formation of a silica gel which gel virtually destroys fluidity of the product. This example indicates that problems would be encountered following the Jones, et al. ('980, supra), and Barber ('847, supra) teaching if the high amounts of fluorine (0.6% or higher), shown in the instant invention to be the minimum threshold amount, were incorporated under conditions reported by Jones, et al., or Barber. For instance, in the teachings of Jones, et al., wherein they admonish against adding more than about 0.5 percent fluorosilicic acid in the third stage, the teachings to those skilled in the art is essentially that more that 0.5 percent fluorine in the process leads to the formation of undesired silica water gels. Indeed, if greater than 0.5 percent fluorosilicic acid is added in Jones, et al.'s, third stage after they have completed their ammoniation such unwanted and undesirable gels do indeed form. These teachings of Jones, et al., in combination with the expertise of those skilled in this art, would lead all to believe that in any such process that the maximum addition of fluorine is as Jones, et al., suggested, i.e., less than 0.5 percent fluorosilicic acid. On the other hand, the instant invention teaches the unexpected discovery that the unique combination of greater than 0.5 percent fluorine as fluorosilicic acid, i.e., at least about 0.6 percent is necessary to achieve the desired results, but only when the sequence of fluorine addition is such that it is added to the feedstock prior to initiation of the ammoniation step, in order for the congeneric metallic impurities (cations) therein to complex with the fluorine and be converted to their respective metal fluoride salts. In so converting said cations to the respective fluorine salts, said cations, particularly aluminum magnesium and calcium, are no longer in a form wherein they will require copious amounts of phosphate and water during post participation of the subsequently ammoniated acid. Rather, said cations as their respective fluoride salts will act to post precipitate only relatively small amounts of fluorine salt. Likewise, in the case of the ferric cation, if it is left in its normal iron ammonium phosphate form it will tie up as much as 32 percent by weight water, whereas by means of the conversion effected under the practice of the instant invention, the conversion to the ferric ammonium phosphate fluoride results in the formation of an anhydrous material which releases all of said water to the solution phase. Satisfactory 10-30-0 grade suspension fertilizers can be produced and stored for up to 60 days at 80° and 100° F. without encountering any formation of silica gels which tend to destroy fluidity. Note: The tests shown in Table VI below are intended only for purposes of comparison of adding $H_2SiF_6$ before the ammoniation step, i.e., tests 1 and 2, and after the ammoniation step, i.e., tests 3 and 4. Accordingly, they report results after 14-day storage, not the 60-day storage at 80° F. and 100° F., just supra.

TABLE VI

Use of Fluorosilicic Acid Production of 10-30-0 Grade Suspension Fertilizer Effects of Order of Addition[a,b]

| Test No. | $H_2SiF_6$ added[a] Wt. % | % F | Viscosity, cP @ 80° F.[d] | After quiescent storage for 14 days @ 100° F. Pourability, % of total volume[e] |
|---|---|---|---|---|
| Batch-type process of the instant invention | | | | |
| 1 | 0.8 | 0.6 | 200 | 100 |
| 2 | 1.2 | 0.9 | 180 | 100 |
| Added after ammoniation step | | | | |
| 3 | 0.8[f,g] | 0.6 | >1000 | 0 |
| 4 | 1.2 | 0.9 | >1000 | 0 |

[a]Added as 23% solution and contains about 18 to 20% fluorine.
[b]Made from MAP. Analyses are shown in Table I, supra.
[c]Suspensions were mixed 5 minutes with a propeller-type stirrer before measurements were made.
[d]After being rotated end over end four times.
[e]$H_2SiF_6$ added prior to the ammoniation step.
[f]Added as carried out by Jones, et al. ('980, supra).
[g]As illustrated in publication entitled "A Waste Recovery Story" by Barber, et al., supra.

EXAMPLE V

In the tests comprising this example, a comparison is shown of the use of fluorosilicic acid as a fluorine source in the production of suspension fertilizers using the instant new batch-type procedure versus the two-stage continuous ammoniation process outlined in previous work by Jones, et al. ('980, supra), and in Barber ('847, supra). The gist of this example is to show that fluorine is evolved when following the teachings of Jones, et al., and would also be evolved in the process proposed and taught by Barber.

Accordingly, tests were made in which MAP was rapidly ammoniated using the instant batch-type process with various levels of fluorosilicic acid in the formulation. Also, simulated tests were made in which wet-process orthophosphoric acid was ammoniated to carry out the tests as mentioned in the work by Jones, et al. ('980, supra). Results of these tests are shown in Table VII, infra.

TABLE VII

Comparison of Our New Batch Procedure Versus Three-Stage Continuous Process on Fluorine Loss During Production[a,b]

| Test No. | Grade | Wt % F added[c] | Total F wt. %[d] | Reactor temp., °F. | Production suspension pH | Total F, wt. % | % F loss |
|---|---|---|---|---|---|---|---|
| Batch-type process of the instant invention | | | | | | | |
| 1 | 10-30-0 | 0 | 1.0 | 170 | 6.6 | 1.0 | 0 |
| 2 | 10-30-0 | 0.6 | 1.6 | 174 | 6.5 | 1.6 | 0 |
| 3 | 10-30-0 | 0.9 | 1.9 | 180 | 6.6 | 2.0 | 0 |
| 4 | 10-30-0 | 1.2 | 2.2 | 190 | 6.6 | 2.3 | 0 |
| First-stage reactor of three-stage continuous process[b] | | | | | | | |
| 5 | X-40-0 | 0.3 | 1.2 | 230 | 5.2[e] | 0.8 | 33 |
| 6 | X-40-0 | 0.2 | 1.1 | 230 | 5.5[e] | 0.7 | 36 |
| 7 | X-40-0 | 0.1 | 1.0 | 230 | 5.0[e] | 0.7 | 30 |

[a]Process consisted of equipment shown in FIG. 1. Raw material was monoammonium phosphate of about 11-52-0 grade.
[b]Process as illustrated in Jones, et al. ('980, supra), and Barber publication on "A Waste Recovery Story," supra, was simulated. Raw material was wet-process orthophosphoric acid.
[c]Added as fluorosilicic acid (23% solution).
[d]Total fluorine available (added to raw material).
[e]First stage ammoniation.

Results from the conduct of the tests shown in Table VII, supra, clearly show that if the fluorine is added to the MAP and rapidly ammoniated according to the present invention, no fluorine is evolved or lost from the reactor. In the three-stage ammoniation process of Jones, et al. ('980, supra), essentially all the extra fluorine plus some of the fluorine already available in the raw materials (wet-acid) was lost during the ammoniation carried out in their first stage. This is because of the low pH (about 5.2) and the boiling temperature (230° F.) in their first stage. These results further illustrate that the fluorine would not be effective in the sequestering of impurities in Jones, et al.'s, overall process because it would be lost during their first stage ammoniation step.

EXAMPLE VI

The results from tests comprising this example illustrate the effect of extra fluorine added as fluorosilicic acid on the water-insoluble content during production and storage of suspension fertilizers made from MAP. In these tests, 10-30-0 grade suspensions were produced from various MAP sources with and without extra fluorine added. Extra fluorine added as fluorosilicic acid was either 0, 0.6, or 1.2 weight percent. The products were evaluated initially and after 60 days' storage at 80° F. The starting MAP used in the suspension production contained 18.9 weight percent water-insoluble solids and was about 11-52-0 in grade. Results of the tests are shown in Table VIII, infra.

TABLE VIII
Phosphate Base Suspension Fertilizers-Effect of Fluorine On Water-Insoluble Contents During Storage[a,b]

|  | Wt % F added[b] | Water-insoluble solids, wt % | | Viscosity, cP at 80° F.[c] | |
|---|---|---|---|---|---|
|  |  | Initial | After 60 days | Initial[d] | After 60 days |
| Starting MAP[a] |  | 18.9 |  |  |  |
| 10-30-0 | 0 | 17.4[d] | 17.4 | 200 | 240 |
| 10-30-0 | 0.6 | 12.3[d] | 6.1 | 200 | 170 |
| 10-30-0 | 1.2 | 7.1[d] | 2.4 | 200 | 160 |

[a]Analyses shown in Table I.
[b]Added as fluorosilicic acid (23% solution).
[c]Measurement after stirring 5 minutes with a propeller-type agitator.
[d]As produced.

The results in Table VIII, supra, show that the extra fluorine significantly reduced the water-insoluble content of the resulting suspensions initially and after 60 days' storage. The reduction in water-insoluble solids content is substantiated by the fact that the viscosity decreased during the 60-day storage period for the 10-30-0 grade product with the extra fluorine added.

EXAMPLE VII

In this example, the effect of fluorine concentration on the citrate-insoluble $P_2O_5$ level in the suspension fertilizer is illustrated using a "sludge" MAP of a very high impurity level ($R_2O_3$+MgO and CaO—total cation concentration expressed as their oxides=9.6 weight percent). In this work, the highest satisfactory grade that could be produced from the sludge MAP was about 7-21-0. Tests were made in which 7-21-0 and 9-21-0 grade suspensions were produced using the same batch procedure outlined in Example I, supra, with and without added fluorine. In the tests in which fluorine was added, 5 weight percent fluorine added as fluorosilicic acid was tested. The citrate-insoluble $P_2O_5$ content was analyzed in the "sludge MAP" as well as in each sample of 7-21-0 grade suspension. The citrate-insoluble content was analyzed both initially and after 60 days' storage at 80° F. To compensate for the added fluorosilicic acid level, extra ammonia was added to the sample with extra fluorine in order to have suspensions with the same pH and have the same phases present (diammonium phosphate) by increasing the grade to 9-21-0. Results of these tests shown in Table IX, infra, indicate that the added fluorine clearly reduced the citrate-insoluble $P_2O_5$ level both during production and storage when compared with the total $P_2O_5$ level.

TABLE IX
Effect of Fluorine on Citrate-Insoluble $P_2O_5$

| Product | C.I. $P_2O_5$, wt % | |
|---|---|---|
|  | Initial | After 60 days |
| MAP solid | 0.9 | — |
| 7-21-0 | 0.5 | 0.5 |
| 9-21-0 + 5% F | 0.3 | <0.2 |

EXAMPLE VIII

Greenhouse tests were made to study the effect of fluorine concentration in suspension fertilizers on corn growth in pot tests. The fluorine concentration was varied from about 10 milligrams per kilogram soil (about 1% F in suspension) to about 170 milligrams per per kilogram of soil (about 9% F in suspension). The summary of the dry matter yield results were: (1) no significant difference was noted among the different sources of fluorine and (2) increased fluorine addition to soil caused a decrease in dry matter yield; however, no significant decreases were predicted with fluorine levels up to 2.3 percent F in the suspension fertilizers.

About 2 percent fluorine would be the highest level anticipated for using in suspension fertilizers made from MAP products of 11-52-0 grade that is currently being used today.

EXAMPLE IX

This example illustrates that the instant process can be carried out in commercial batch mixers of large scale. The results for this example were obtained in field evaluation tests on the use of fluorosilicic acid in the production of suspensions from MAP in a 5-ton batch. In these tests, two 5-ton batches were produced, one with and one without fluorine added. Results from this work showed improvements were made in breakdown time of the MAP during processing into a 10-30-0 grade suspension fertilizer and a reduction in the crystal growth of the diammonium phosphate in the product suspension during storage. The suspensions were produced at a selected dealer site for further evaluations of the storage properties on a larger scale. Results are shown in Table X, infra.

Measurements were made initially after production. Solids were measured by pouring samples of the feedstock slurry through a 20-mesh stainless steel screen, washing with acetone, drying, and weighing the solids for making the determinations. Effective upper limit means that 99 percent of the crystals are this size or smaller. Crystal size measurements were made after storage for 14 days at 75° F.

TABLE X
Effect of Fluorine on Breakdown of MAP and DAP Crystal Size in 10-30-0 Suspension

| Grade | Wt % F added[a] | MAP breakdown, (% solids >20 mesh) | Crystal size, (effective upper limit), μm |
|---|---|---|---|
| 10-30-0 | 1.0 | <0.5 | 200 × 200 |
| 10-30-0 | 0 | 4.6 | 600 × 700 |

[a]Added as fluorosilicic acid (23% solution).

The results shown in Table X, supra, clearly indicate that with $H_2SiF_6$ improvements were made in both the disintegration and dissolution of the MAP granules during processing into a suspension and that the DAP crystal growth was inhibited during storage when compared to the suspensions produced without extra fluorine added.

INVENTION PARAMETERS

After sifting and winnowing through the data supra, as well as other results of tests and operations of the instant, new, novel, and improved technique including methods and means for producing orthophosphate suspension fertilizers by a new batch-type process, the operating variables, including acceptable and preferred conditions for carrying out or practicing the instant invention are summarized below:

| Variables | Operating Limits | Preferred Limits | Most Preferred Limits |
|---|---|---|---|
| MAP | 10-50-0–11-54-0 | 11-52-0–11-54-0 | 11-54-0 |
| W.I. solids, wt % | 10-30 | 10-20 | 10-17 |
| $H_2SiF_6$, wt % F[a] | 0.6-5 | 1-3 | 1-2 |

-continued

| Variables | Operating Limits | Preferred Limits | Most Preferred Limits |
|---|---|---|---|
| Retention time,[g] | 1-5 | 1-4 | 2-3 |
| Temp, °F.[b] | 120-200 | 130-190 | 150-170 |
| N:P$_2$O$_5$ wt. ratio | 0.30-0.35 | 0.31-0.34 | 0.32-0.33 |
| Retention time, min. (NH$_3$ addition) | 10-40 | 10-30 | 15-20 |
| pH[d] | 6.0-7.2 | 6.4-7.0 | 6.6-7.0 |
| clay, % by wt[e] | 1-2 | 1-1.5 | 1-1.5 |
| Cooler-clay mixer (optional) | | | |
| Temp, °F[f] | 100-140 | 120-140 | 125-135 |
| Retention time, min. | 5-30 | 5-20 | 5-10 |

[a]Added as a solution, usually about 23 weight percent H$_2$SiF$_6$.
[b]Maximum temperature reached during the ammoniation step.
[c]Cooler can be used if desired.
[d]Diluted 1 to 4 with water.
[e]Should be added in cooler-clay mixer if used.
[f]For production of an abundance of ammonium phosphates crystals, the temperature should not exceed about 140° F.
[g]Time between introduction of H$_2$SiF$_6$ and initiation of ammoniation step sufficient to allow cations to form fluorides, but not so long as to cause possible evolution of fluorine, more of a problem in hot wet-process acid.

While we have shown and described particular embodiments of our invention, modifications, and variations thereof will occur to those skilled in the art. We wish it to be understood, therefore, that the appended claims are intended to cover such modifications and variations which are within the true scope and spirit of our invention.

What we claim as new and desire to secure by Letters Patent of the United States is:

1. A process for the production of ammonium orthophosphate suspension fertilizers from ammonia and certain solid intermediates which product suspensions contain from about 10 to about 12 weight percent nitrogen and about 30 to about 36 weight percent P$_2$O$_5$, and have excellent physical properties including low viscosities and high pourabilities and exhibit desirable long term storage characteristics, which process comprises the steps of:

(a) introducing into reactor means predetermined quantities of water of formulation and predetermined quantities of solid intermediates derived from wet-process phosphoric acids along with predetermined quantities of fluorosilicic acid sufficient to provide from about 0.6 to 5.0 weight percent fluorine in the product suspension removed in step (h), infra;

(b) maintaining said fluorosilicic acid introduced in step (a), supra, in continuous and intimate contact with the phosphate-containing materials introduced therein for a period of time ranging from about 1 minute to about 5 minutes;

(c) subsequently introducing into the resulting fluorosilicic acid treated phosphate-containing materials, predetermined quantities of ammoniating media sufficient to effect at least a partially ammoniated ammonium orthophosphate slurry material having a N:P$_2$O$_5$ weight ratio ranging from about 0.30:1 to about 0.35:1 and having a pH ranging from between about 6.0 and about 7.2;

(d) intimately mixing the materials combined in step (c), supra, and maintaining the resulting mixture at a temperature in the range from about 120° to about 200° F. for a time ranging from about 10 to about 40 minutes;

(e) removing at least a portion of the resulting at least partially ammoniated material effected in step (d), supra, and introducing same into cooler-clay mixer means and therin rapidly cooling such introduced at least partially ammoniated material to a temperature ranging from about 100 to about 140° F.;

(f) introducing predetermined portions of clay into the cooled at least partially ammoniated material resulting in step (e), supra,;

(g) maintaining said clay introduced in step (f) supra in continuous and intimate contact with said cooled material for a period of time ranging from about 5 to about 30 minutes to thereby effect the formation of a resulting gelled suspension; and (h) recovering as product the gelled suspension resulting in step (g), supra, for ultimate use in the production of NPK suspension mixtures, direct application, or storage;

said process characterized by the fact that mixing of said fluorosilicic acid with said solid intermediates prior to the ammoniation thereof effects a substantial reduction of the overall water-insoluble content and substantially increases the available citrate-soluble P$_2$O$_5$ thereof by the conversion of the congeneric cations therein to the respective fluorine salts prior to the ammoniation step and wherein is effected substantially improved disintegration of the solid intermediate particulates during such subsequent ammoniation.

2. The process of claim 1 wherein said solid intermediates comprise MAP and contain from about 10 to about 11 weight percent nitrogen and from about 50 to about 54 weight percent P$_2$O$_5$, having an initial pH of about 3, and containing from about 10 to about 30 weight percent solids.

3. The process of claim 2 wherein predetermined portions of wet-process acid are substituted for said water of formulation.

4. The process of claim 2 wherein the predetermined quantities of ammonia introduced therein is sufficient to effect an N:P$_2$O$_5$ weight ratio ranging from about 0.31:1 to about 0.34:1 and effect raising the initial pH of said solid intermediate from about 3 to the range from about 6.4 to about 7.0.

5. The process of claim 3 wherein the predetermined quantities of ammonia introduced therein is sufficient to effect an N:P$_2$O$_5$ weight ratio ranging from about 0.31:1 to about 0.34:1 and effect raising the initial pH of said solid intermediate from about 3 to the range from about 6.4 to about 7.0.

6. The process of claim 4 wherein said predetermined quantity of ammonia is sufficient to effect an N:P$_2$O$_5$ weight ratio ranging from about 0.32:1 to about 0.33:1 and effect raising said initial pH of said solid intermediate up to the range of about 6.6 to 7.0.

7. The process of claim 5 wherein said predetermined quantity of ammonia is sufficient to effect an N:P$_2$O$_5$ weight ratio ranging from about 0.32:1 to about 0.33:1 and effect raising said initial pH of said solid intermediate up to the range of about 6.6 to 7.0.

8. The process of claim 2 wherein the predetermined quantities of fluorosilicic acid added ranges from about 1 to 3 weight percent fluorine.

9. The process of claim 3 wherein the predetermined quantities of fluorosilicic acid added ranges from about 1 to 3 weight percent fluorine.

10. The process of claim 8 wherein the predetermined quantities of fluorosilicic acid ranges from about 1 to about 2 weight percent fluorine.

11. The process of claim 9 wherein said predetermined quantities of fluorosilicic acid ranges from about 1 to about 2 weight percent fluorine.

12. A process for the production of ammonium orthophosphate suspension fertilizers from ammonia and certain solid intermediates which suspensions contain from about 10 to about 12 weight percent nitrogen and about 30 to about 36 weight percent $P_2O_5$, and have excellent physical properties including low viscosities and high pourabilities and exhibit desirable long term storage characteristics, which process comprises the steps of:

(a) introducing into reactor means predetermined quantities of water of formulation and predetermined quantities of solid intermediates derived from wet-process phosphoric acids along with predetermined quantities of fluorosilicic acid sufficient to provide from about 0.6 to about 5.0 weight percent fluorine in the product suspension removed in step (g), infra;

(b) maintaining said fluorosilicic acid introduced in step (a), supra, in continuous and intimate contact with the phosphate-containing materials introduced therein for a period of time ranging from about 1 minute to about 5 minutes;

(c) subsequently introducing into the resulting fluorosilicic acid treated phosphate-containing materials, predetermined quantities of ammoniating media sufficient to effect at least a partially ammoniated ammonium orthophosphate slurry material having a $N:P_2O_5$ weight ratio ranging from about 0.30:1 to about 0.35:1 and having a pH ranging from between about 6.0 and about 7.2;

(d) intimately mixing the materials combined in step (c), supra, and maintaining the resulting mixture at a temperature in the range from about 120° to about 200° F. for a time ranging from about 10 to about 40 minutes;

(e) introducing into the resulting at least partially ammoniated material effected in step (d), supra, predetermined quantities of gelling clay;

(f) maintaining said clay introduced in step (e), supra, in continuous and intimate contact with said at least partially ammoniated material for a period of time ranging from about 5 minutes to about 30 minutes to thereby effect the formulation of a resulting gelled suspension; and (g) recovering as product the gelled suspension resulting in step (f), supra, for ultimate use in the production of NPK suspension mixtures, direct application, or storage;

said process characterized by the fact that mixing of said fluorosilicic acid with said solid intermediates prior to the ammoniation thereof effects a substantial reduction of the overall water-insoluble content and substantially increases the available citrate-soluble $P_2O_5$ thereof by the conversion of the congeneric cations therein to the respective fluorine salts prior to the ammoniation step, wherein is effected substantially improved disintegration of the solid intermediate particulates during such subsequent ammoniation, and wherein a separate cooling step subsequent to the ammoniation and prior to the clay addition, is herein substantially eliminated.

13. The process of claim 12 wherein said solid intermediates comprise MAP and contain from about 10 to about 11 weight percent nitrogen and from about 50 to about 54 weight percent $P_2O_5$, having an initial pH of about 3, and containing from about 10 to about 30 weight percent solids.

14. The process of claim 13 wherein predetermined portions of wet-process acid are substituted for said water of formulation.

15. The process of claim 13 wherein the predetermined quantities of ammonia introduced effects an $N:P_2O_5$ weight ratio ranging from about 0.31:1 to about 0.34:1 and effects raising the initial pH of said solid intermediate from about 3 to the range from about 6.4 to about 7.0.

16. The process of claim 14 wherein the predetermined quantities of ammonia introduced effects an $N:P_2O_5$ weight ratio ranging from about 0.31:1 to about 0.34:1 and effects raising the initial pH of said solid intermediate from about 3 to the range from about 6.4 to about 7.0.

17. The process of claim 15 wherein the said predetermined quantity of ammonia is sufficient to effect an $N:P_2O_5$ weight ratio ranging from about 0.32:1 to about 0.33:1 and effects raising said initial pH of said solid intermediate up to the range of about 6.6 to about 7.0.

18. The process of claim 16 wherein the said predetermined quantity of ammonia is sufficient to effect an $N:P_2O_5$ weight ratio ranging from about 0.32:1 to about 0.33:1 and effects raising said initial pH of said solid intermediate up to the range of about 6.6 to about 7.0.

19. The process of claim 12 wherein predetermined quantities of fluorosilicic acid added to step (b) ranges from about 1 to about 3 weight percent fluorine.

20. The process of claim 14 wherein predetermined quantities of fluorosilicic acid added to step (b) ranges from about 1 to about 3 weight percent fluorine.

21. The process of claims 19 wherein the predetermined quantities of fluorosilicic acid ranges from about 1 to about 2 weight percent fluorine.

22. The process of claims 20 wherein the predetermined quantities of fluorosilicic acid ranges from about 1 to about 2 weight percent fluorine.

* * * * *